(12) United States Patent
Koike et al.

(10) Patent No.: US 8,384,355 B2
(45) Date of Patent: Feb. 26, 2013

(54) BATTERY STATE MONITORING CIRCUIT AND BATTERY DEVICE

(75) Inventors: Toshiyuki Koike, Chiba (JP); Atsushi Sakurai, Chiba (JP); Kazuaki Sano, Chiba (JP); Wataru Sakamoto, Chiba (JP); Fumihiko Maetani, Chiba (JP); Shohei Tsukamoto, Chiba (JP)

(73) Assignee: Seiko Instruments Inc., Chiba (JP)

( * ) Notice: Subject to any disclaimer, the term of this patent is extended or adjusted under 35 U.S.C. 154(b) by 370 days.

(21) Appl. No.: 12/874,027

(22) Filed: Sep. 1, 2010

(65) Prior Publication Data

US 2011/0050176 A1 Mar. 3, 2011

(30) Foreign Application Priority Data

Sep. 2, 2009 (JP) ................. 2009-203137

(51) Int. Cl.
*H01M 10/46* (2006.01)
(52) U.S. Cl. ....................................................... 320/132
(58) Field of Classification Search .................. 320/107, 320/128, 132, 134, 136, 149, DIG. 19, DIG. 21; 324/425, 426, 433
See application file for complete search history.

(56) References Cited

U.S. PATENT DOCUMENTS 6,380,763 B1 * 4/2002 Ando ............................. 326/81
2002/0130634 A1 * 9/2002 Ziemkowski et al. ........ 320/106

FOREIGN PATENT DOCUMENTS

JP 2000-308266 A 11/2000

* cited by examiner

*Primary Examiner* — Edward Tso
(74) *Attorney, Agent, or Firm* — Brinks Hofer Gilson & Lione

(57) ABSTRACT

Provided are a battery state monitoring circuit and a battery device that are capable of reliably controlling charge by a charger even if a voltage of a secondary battery drops to around 0 V. In the battery device provided with the battery state monitoring circuit, respective gate voltages of a P-type metal oxide semiconductor (PMOS) transistor and an N-type metal oxide semiconductor (NMOS) transistor, which together form a voltage detection circuit for detecting a voltage of around 0 V of the secondary battery, are applied by a voltage dividing resistor circuit that is connected across terminals of the secondary battery.

2 Claims, 3 Drawing Sheets

US 8,384,355 B2

BATTERY STATE MONITORING CIRCUIT AND BATTERY DEVICE

RELATED APPLICATIONS

This application claims priority under 35 U.S.C. §119 to Japanese Patent Application No. 2009-203137 filed on Sep. 2, 2009, the entire content of which is hereby incorporated by reference.

BACKGROUND OF THE INVENTION

1. Field of the Invention

The present invention relates to a battery state monitoring circuit and a battery device that detect a voltage and an abnormality of a secondary battery, and more particularly, to a battery state monitoring circuit and a battery device that are capable of controlling charge by a charger even if a secondary battery voltage drops to around 0 V.

2. Description of the Related Art

A battery device is provided with a function of allowing/inhibiting the charge to a secondary battery when a charger is connected thereto in a state where a voltage of the secondary battery extremely drops to around 0 V (see, for example, Japanese Patent Application Laid-open No. 2000-308266). Hereinafter, such a function is referred to as function of allowing/inhibiting 0 V charge.

FIG. 3 illustrates a circuit diagram of a battery device provided with a conventional battery state monitoring circuit. The battery device provided with the conventional battery state monitoring circuit includes a secondary battery 1, a charge/discharge control circuit 2 for monitoring a voltage of the secondary battery 1, a switch circuit 3 for controlling the charge and discharge of the secondary battery 1, external terminals 4 and 5 between which a charger 8 or a load 9 is to be connected, and a charge switch drive circuit 7 for outputting a control signal to a charge switch 11. The charge switch drive circuit 7 includes a level shifter circuit 15 that is connected to an output terminal of the charge/discharge control circuit 2, a P-type metal oxide semiconductor (PMOS) transistor 16, an N-type metal oxide semiconductor (NMOS) transistor 17, a resistor 18, an inverter (INV) circuit 26, a NOR circuit 25, a PMOS transistor 20, and an NMOS transistor 21. The PMOS transistor 16, the NMOS transistor 17, and the resistor 18 together form a voltage detection circuit for detecting a negative terminal voltage of the secondary battery 1. The PMOS transistor 20 and the NMOS transistor 21 together form an output circuit of the charge switch drive circuit 7. The battery device of FIG. 3 has a function of allowing the 0 V charge.

The battery device described above functions to allow the 0 V charge through the following operations.

The charge/discharge control circuit 2 operates with the voltage of the secondary battery 1 to monitor the voltage of the secondary battery 1. If the voltage of the secondary battery 1 increases to an overcharge voltage or higher, the charge/discharge control circuit 2 outputs a signal of Low to the charge switch drive circuit 7. On the other hand, if the voltage of the secondary battery 1 falls below the overcharge voltage, the charge/discharge control circuit 2 outputs a signal of High to the charge switch drive circuit 7. The charge switch drive circuit 7 operates with an inter-external terminal voltage between the external terminals 4 and 5. The level shifter circuit 15 converts the signal of the charge/discharge control circuit 2 into the inter-external terminal voltage. Each of the PMOS transistor 16 and the NMOS transistor 17 has a gate connected to a negative terminal of the secondary battery 1. In a state where the secondary battery 1 has a sufficient voltage, the PMOS transistor 16 is turned ON to output a signal of Low to the NOR circuit 25. On the other hand, if the voltage of the secondary battery 1 falls to around 0 V, the NMOS transistor 17 is turned ON to output a signal of High to the NOR circuit 25.

The NOR circuit 25 outputs a signal of Low when at least one of its input signals is High. Accordingly, a voltage of an output terminal 13 becomes High to turn ON the charge switch 11 so that the charge may be allowed. On the other hand, the NOR circuit 25 outputs a signal of High when both of its input signals are Low. Accordingly, the voltage of the output terminal 13 becomes Low to turn OFF the charge switch 11 so that the charge may be inhibited. Therefore, even if the voltage of the secondary battery 1 falls to around 0 V, the charge switch drive circuit 7 allows the charge. In other words, the battery device functions to allow the 0 V charge.

Meanwhile, in the above-mentioned charge switch drive circuit 7, each of the gates of the PMOS transistor 16 and the NMOS transistor 17 forming the voltage detection circuit is connected to the negative terminal of the secondary battery 1, which leads to the following drawback.

At what voltage the voltage detection circuit removes inhibition on the charge to allow the charge to the secondary battery 1 is determined based on a threshold voltage of the PMOS transistor 16. Further, there is a fluctuation in threshold voltage of the PMOS transistor 16. The output signal of the charge/discharge control circuit 2 is indefinite until the voltage of the secondary battery 1 becomes equal to or higher than a minimum operating voltage of the charge/discharge control circuit 2. Therefore, there is a fear that the output signal of the charge/discharge control circuit 2 may be indefinite when the voltage detection circuit removes inhibition on the charge to allow the charge. If the output signal of the charge/discharge control circuit 2 corresponds to a signal of inhibiting the charge, the charge to the secondary battery 1 is inhibited. As a result, such a malfunction occurs that the inhibition of the charge to the secondary battery 1 cannot be canceled any more once the charge thereto is inhibited.

SUMMARY OF THE INVENTION

The present invention has been devised in order to solve the problem described above, and therefore, it is an object of the invention to provide a battery state monitoring circuit and a battery device that are capable of reliably controlling charge by a charger even if a voltage of a secondary battery drops to around 0 V.

In order to solve the conventional problem, a battery device provided with a battery state monitoring circuit according to the present invention has the following configuration.

In the battery device provided with the battery state monitoring circuit, respective gate voltages of a P-type metal oxide semiconductor (PMOS) transistor (16) and an N-type metal oxide semiconductor (NMOS) transistor (17), which together form a voltage detection circuit for detecting a voltage of around 0 V of a secondary battery, are applied by a voltage dividing resistor circuit (23) that is connected across terminals of the secondary battery.

According to the battery device provided with the battery state monitoring circuit of the present invention, the voltage dividing resistor circuit (23) connected across the terminals of the secondary battery applies a voltage to the voltage detection circuit. Therefore, the voltage to be detected by the voltage detection circuit may be set to be equal to or higher than a minimum operating voltage of a charge/discharge control circuit, to thereby charge the secondary battery reliably.

Therefore, the present invention produces an effect of reliably controlling charge by a charger even if the voltage of the secondary battery drops to around 0 V.

DETAILED DESCRIPTION OF THE PREFERRED EMBODIMENTS

Figure 1:
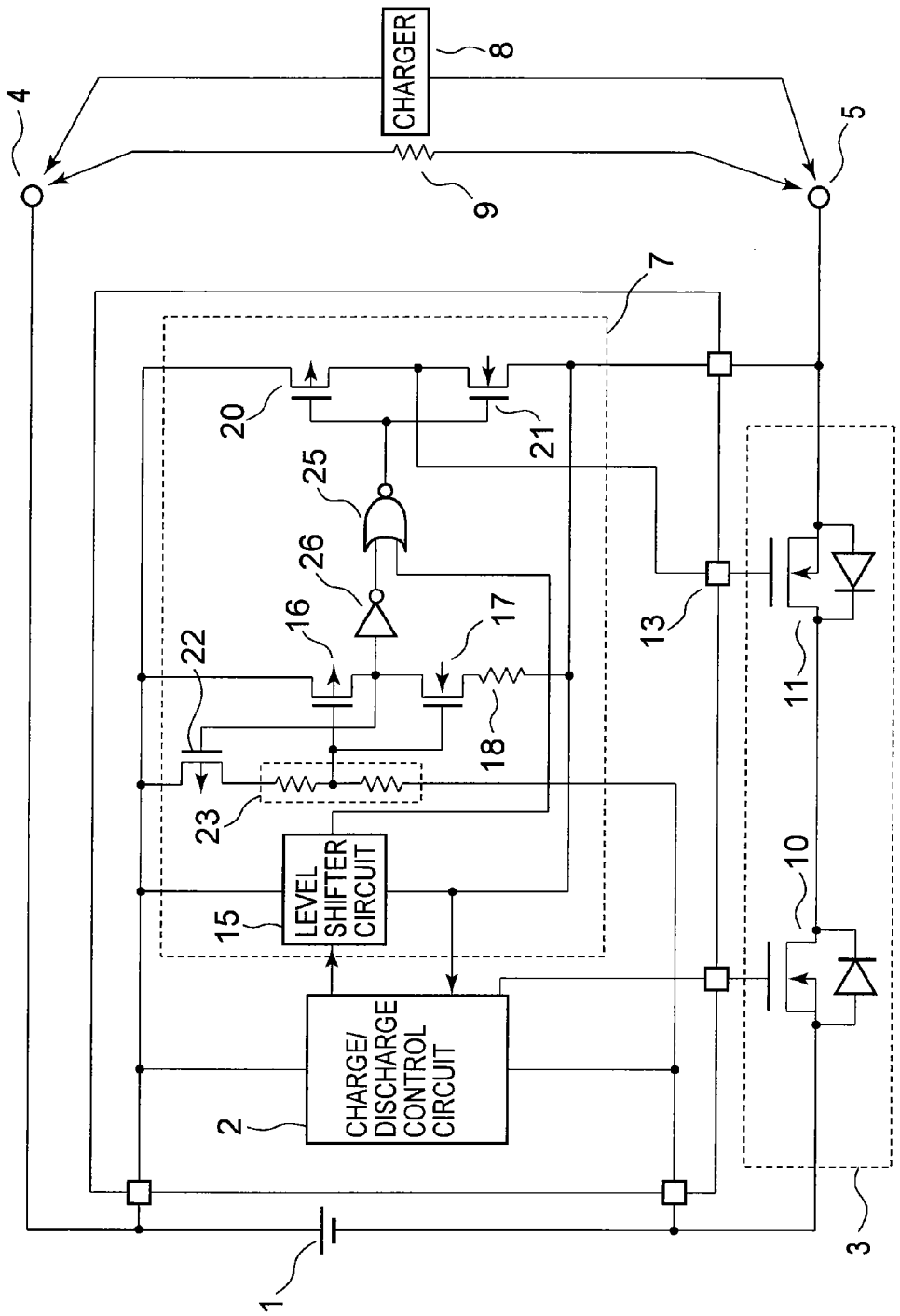
FIG. 1 is a circuit diagram of a battery device provided with a battery state monitoring circuit according to an embodiment of the present invention.

FIG. 1 is a circuit diagram of a battery device provided with a battery state monitoring circuit according to an embodiment of the present invention.

The battery device provided with the battery state monitoring circuit according to this embodiment includes a secondary battery 1, a charge/discharge control circuit 2 for monitoring a voltage of the secondary battery 1, a switch circuit 3 (a discharge switch 10 and a charge switch 11) for controlling the charge and discharge of the secondary battery 1, external terminals 4 and 5 between which a charger 8 or a load 9 is to be connected, and a charge switch drive circuit 7 for outputting a control signal to a charge switch 11. The charge switch drive circuit 7 includes a level shifter circuit 15 that is connected to an output terminal of the charge/discharge control circuit 2, a P-type metal oxide semiconductor (PMOS) transistor 16, an N-type metal oxide semiconductor (NMOS) transistor 17, a resistor 18, an inverter (INV) circuit 26, a voltage dividing resistor circuit 23, a NOR circuit 25, a PMOS transistor 20, and an NMOS transistor 21. The PMOS transistor 16, the NMOS transistor 17, and the resistor 18 together form a voltage detection circuit for detecting a negative terminal voltage of the secondary battery 1. The PMOS transistor 20 and the NMOS transistor 21 together form an output circuit of the charge switch drive circuit 7. The battery device of FIG. 1 has a function of allowing the 0 V charge.

In the voltage detection circuit, the PMOS transistor 16, the NMOS transistor 17, and the resistor 18 are connected in series between a positive terminal of the secondary battery 1 and the external terminal 5. Further, the voltage dividing resistor circuit 23 is connected between the positive and negative terminals of the secondary battery 1, and outputs a divided voltage to respective gates of the PMOS transistor 16 and the NMOS transistor 17. Note that, in order to turn ON the NMOS transistor 17 more strongly, the NMOS transistor 17 may be supplied with a positive terminal voltage of the secondary battery 1, rather than the divided voltage.

The NOR circuit 25 is supplied with an output signal of the level shifter circuit 15 and an output signal of the voltage detection circuit via the INV circuit 26, and outputs a control signal to the output circuit.

The battery device described above functions to allow the 0 V charge through the following operations.

The charge/discharge control circuit 2 operates with the voltage of the secondary battery 1 to monitor the voltage of the secondary battery 1. If the voltage of the secondary battery 1 increases to an overcharge voltage or higher, the charge/discharge control circuit 2 outputs a signal of Low to the charge switch drive circuit 7. On the other hand, if the voltage of the secondary battery 1 falls below the overcharge voltage, the charge/discharge control circuit 2 outputs a signal of High to the charge switch drive circuit 7. The charge switch drive circuit 7 operates with an inter-external terminal voltage between the external terminals 4 and 5. The level shifter circuit 15 converts the signal of the charge/discharge control circuit 2 into the inter-external terminal voltage.

In a state where the secondary battery 1 has a sufficient voltage, the PMOS transistor 16 is turned ON to output a signal of Low to the NOR circuit 25 via the INV circuit 26. On the other hand, if the voltage of the secondary battery 1 falls to around 0 V, the NMOS transistor 17 is turned ON to output a signal of High to the NOR circuit 25.

The NOR circuit 25 outputs a signal of Low when at least one of its input signals is High. Accordingly, a voltage of an output terminal 13 becomes High to turn ON the charge switch 11 so that the charge may be allowed. On the other hand, the NOR circuit 25 outputs a signal of High when both of its input signals are Low. Accordingly, the voltage of the output terminal 13 becomes Low to turn OFF the charge switch 11 so that the charge may be inhibited.

Connected to the gates of the PMOS transistor 16 and the NMOS transistor 17 is an output terminal of the voltage dividing resistor circuit 23. Therefore, a voltage for turning OFF the PMOS transistor 16 is determined based on the divided voltage and a threshold voltage of the PMOS transistor 16. In other words, through the adjustment to resistances of the voltage dividing resistor circuit 23, the voltage for turning OFF the PMOS transistor 16 may be set to be equal to or higher than a minimum operating voltage of the charge/discharge control circuit 2.

Now, description is given of an operation performed when the voltage of the secondary battery 1 falls to around 0 V.

When the voltage of the secondary battery 1 falls to around 0 V, which is lower than the minimum operating voltage of the charge/discharge control circuit 2, the output signal to the level shifter circuit 15 is indefinite. The output of the voltage dividing resistor circuit 23 takes a value approximate to the positive terminal voltage of the secondary battery 1. Accordingly, the PMOS transistor 16 is turned OFF because a gate-source voltage Vgs thereof is reduced. Therefore, even if the voltage of the secondary battery 1 falls to around 0 V, the charge switch drive circuit 7 allows the charge. In other words, the battery device functions to allow the 0 V charge.

Note that, a current of the secondary battery 1 flows through the voltage dividing resistor circuit 23. In view of this, another configuration may be employed in which a switch circuit 22 is provided between the positive terminal of the secondary battery 1 and the voltage dividing resistor circuit 23 so that the current may be prevented from flowing when the detection function for the 0 V charge is unnecessary.

Figure 2:
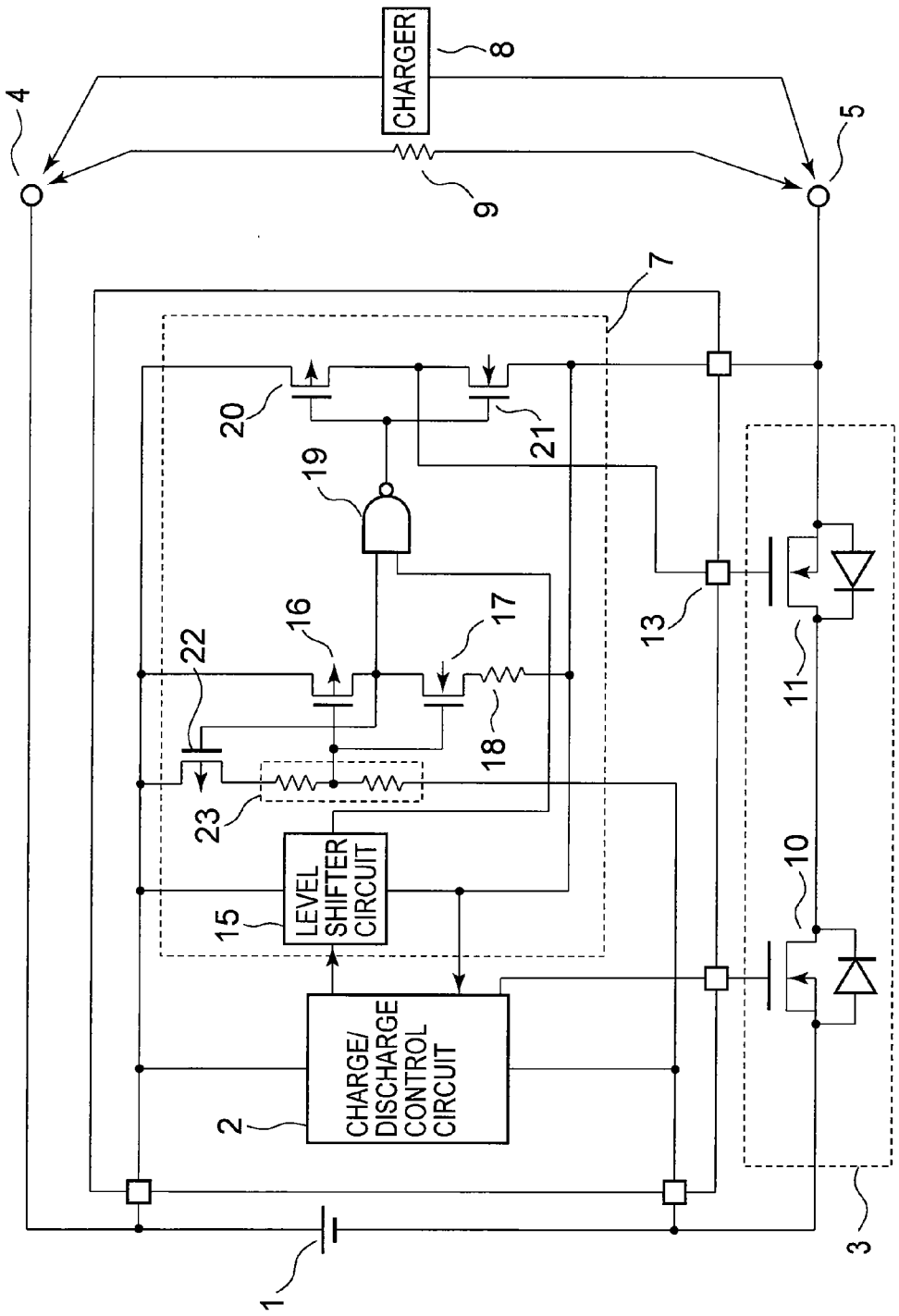
FIG. 2 is a circuit diagram of a battery device provided with a battery state monitoring circuit according to another embodiment of the present invention.
Figure 3:
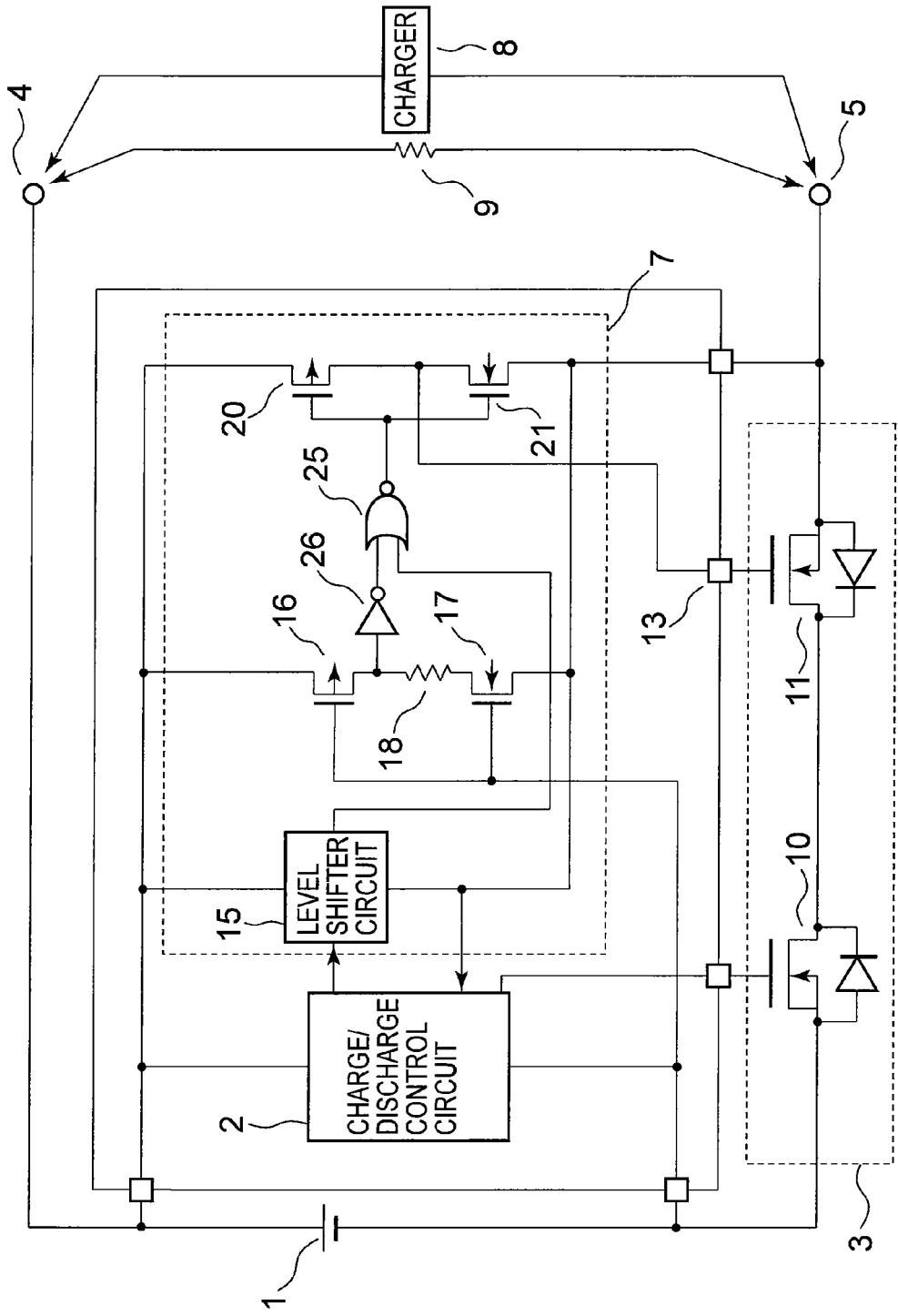
FIG. 3 is a circuit diagram of a battery device provided with a conventional battery state monitoring circuit.

FIG. 2 illustrates a circuit diagram of a battery device provided with a battery state monitoring circuit according to another embodiment of the present invention. The battery device of FIG. 2 exemplifies a circuit configuration for inhibiting the 0 V charge. The output signal of the voltage detection circuit is input to the output circuit via a NAND circuit 19.

When the voltage detection circuit of the present invention is provided to the battery state monitoring circuit configured as described above, voltage accuracy for turning ON/OFF the PMOS transistor 16 and the NMOS transistor 17 may be improved through the setting of the resistances of the voltage dividing resistor circuit 23.

Note that, the embodiments have been described for the configuration in which the switch circuit 3 is provided on the negative terminal side of the secondary battery 1. Alternatively, the same effect can also be obtained in a configuration in which the switch circuit 3 is provided on the positive terminal side of the secondary battery 1, as long as a reference voltage is provided on the negative terminal side of the secondary battery 1.

What is claimed is:

1. A battery state monitoring circuit for controlling charge and discharge of a secondary battery, the battery state monitoring circuit comprising:
- a charge/discharge control circuit that is connected across terminals of the secondary battery, for monitoring a voltage of the secondary battery;
- a charge switch; and
- a charge switch control circuit for outputting an output signal of the charge/discharge control circuit to the charge switch, wherein the charge switch control circuit operates with a voltage between external terminals of the battery state monitoring circuit, and wherein the charge switch control circuit comprises:
- a level shifter circuit for converting the output signal of the charge/discharge control circuit into the voltage between the external terminals;
- a voltage dividing resistor circuit that is connected across the terminals of the secondary battery, for generating a divided voltage;
- a voltage detection circuit that is supplied with the divided voltage, for detecting a voltage for 0 V charge; and
- an output circuit that is supplied with respective output voltages of the level shifter circuit and the voltage detection circuit, for controlling the charge switch.

2. A battery device, comprising:

a chargeable/dischargeable secondary battery;

a switch circuit that is provided between the chargeable/dischargeable secondary battery and an external terminal of the battery device, for controlling charge and discharge of the chargeable/dischargeable secondary battery; and the battery state monitoring circuit according to claim 1 for monitoring a voltage across terminals of the chargeable/dischargeable secondary battery.

* * * * *